United States Patent [19]
Brazas, Jr. et al.

[11] Patent Number: 5,696,749
[45] Date of Patent: Dec. 9, 1997

[54] DUAL-WAVELENGTH OPTICAL RECORDING HEAD UTILIZING GRATING BEAM SPLITTER AND INTEGRATED LASER AND DETECTORS

[75] Inventors: John C. Brazas, Jr., Hilton; David B. Kay, Rochester, both of N.Y.

[73] Assignee: Eastman Kodak Company, Rochester, N.Y.

[21] Appl. No.: 672,735

[22] Filed: Jun. 28, 1996

[51] Int. Cl.$^6$ .................................................. G11B 7/00
[52] U.S. Cl. ........................................ 369/109; 369/112
[58] Field of Search ................................. 369/109, 110, 369/112, 120, 44.37, 100, 44.14, 44.11, 43

[56] References Cited

U.S. PATENT DOCUMENTS

| | | | |
|---|---|---|---|
| 4,945,529 | 7/1990 | Ono et al. | 369/109 |
| 5,050,153 | 9/1991 | Lee | 369/112 |
| 5,093,821 | 3/1992 | Katayama et al. | 369/112 |
| 5,278,813 | 1/1994 | Ohnishi et al. | 369/112 X |
| 5,363,363 | 11/1994 | Gage | 369/116 |
| 5,513,164 | 4/1996 | Tanaka et al. | 369/112 |
| 5,544,143 | 8/1996 | Kay et al. | 369/112 X |
| 5,557,601 | 9/1996 | Nishikawa | 369/112 X |

OTHER PUBLICATIONS

W. Ophey, "Compact Optical Light Paths," Jpn. J. Appl. Phys., vol. 32, Part 1, No. 11B, pp. 5252–5257, Nov. 1993.
K. Hamada et al, "Optical Mass Data Storage II," Proc. SPIE vol. 695, pp. 182–186, 1986.

*Primary Examiner*—Paul W. Huber
*Attorney, Agent, or Firm*—Raymond L. Owens

[57] ABSTRACT

In an optical system for generating a radiation beam to be applied to a data track of an optical storage medium is disclosed. The system includes first and second optical light sources producing light at different wavelengths and optics for receiving light from the first and second sources and including a selective beam splitter for selectively applying light from each optical light source to the data track of the optical storage medium and defining an optical axis for each optical light source along which light is projected to the data track.

2 Claims, 8 Drawing Sheets

DUAL-WAVELENGTH OPTICAL RECORDING HEAD UTILIZING GRATING BEAM SPLITTER AND INTEGRATED LASER AND DETECTORS

FIELD OF THE INVENTION

The present invention relates generally to optical read/write heads used in optical information storage and retrieval systems which use multiple wavelengths.

BACKGROUND OF THE INVENTION

In many optical information storage and retrieval systems, a radiation beam from an optical source is reflected and diffracted from a data track on an optical storage medium. The beam returning from the storage medium may be directed to a light detector array that provides signals used to generate, for example, a focus error signal (FES), a tracking error signal (TES) and a data signal. The FES and TES generally drive servo systems for maintaining the radiation beam in-focus and on-track, respectively, relative to the storage medium. The data signal is indicative of the data stored on the data track scanned by the radiation beam. The portion of the optical system which generates and processes the radiation beam is generally referred to as an optical head.

The stability of an optical head is usually improved by decreasing the distance between certain critical components, such as an optical source, beam splitter and detector array. In addition, the cost and complexity of the optical head is reduced if these components are integrated into a single package. A known technique for accomplishing these objectives involves combining components such as an optical source, a grating beam splitter and a detector array into an integrated package generally referred to as a laser-detector-grating unit (LDGU). LDGUs are also known as laser/detector optical heads and hologram laser units. Optical systems which incorporate an LDGU or a similar device will be referred to herein as LDGU-based systems. A number of exemplary LDGU-based systems are described in W. Ophey, "Compact Optical Light Paths," Jpn. J. Appl. Phys., Vol. 32, Part 1, No. 11B, pp. 5252–5257, November 1993. Other LDGU-based systems are described in, for example, U.S. Pat. Nos. 5,050,153 and 4,945,529. An exemplary optical head in accordance with U.S. Pat. No. 4,945,529 includes a diffraction grating with four grating regions. The four grating regions direct portions of a reflected and diffracted radiation beam to a detector assembly in order to generate an FES, a TES and a data signal.

The above-noted LDGU-based systems suffer from a drawback in that only a single wavelength beam is used for recording on optical storage medium.

SUMMARY OF THE INVENTION

It is an object of the present invention to provide improved optical read/write structures which use more than one light source in an optical recording.

It is a further object to provide a head which permits the recording and reading of information at different wavelengths thereby facilitating different media and formats in the same optical disk drive.

This object is achieved by an optical system for generating a radiation beam to be applied to a data track of an optical storage medium, the improvement comprising:

a) first and second optical light sources producing light at different wavelengths;

b) optics for receiving light from the first and second sources and including a selective beam splitter for selectively applying light from each optical light source to the data track of the optical storage medium and defining an optical axis for each optical light source along which light is projected to the data track.

ADVANTAGES

The dual-wavelength feature of optical recording heads in accordance with this invention permits reading or recording information using media of different construction or different recording formats. The recording media and formats can be associated with different wavelengths. A further feature of the invention is that it can facilitate the increase the density of data recorded on the disk surface.

DETAILED DESCRIPTION OF THE PREFERRED EMBODIMENTS

Figure 1:
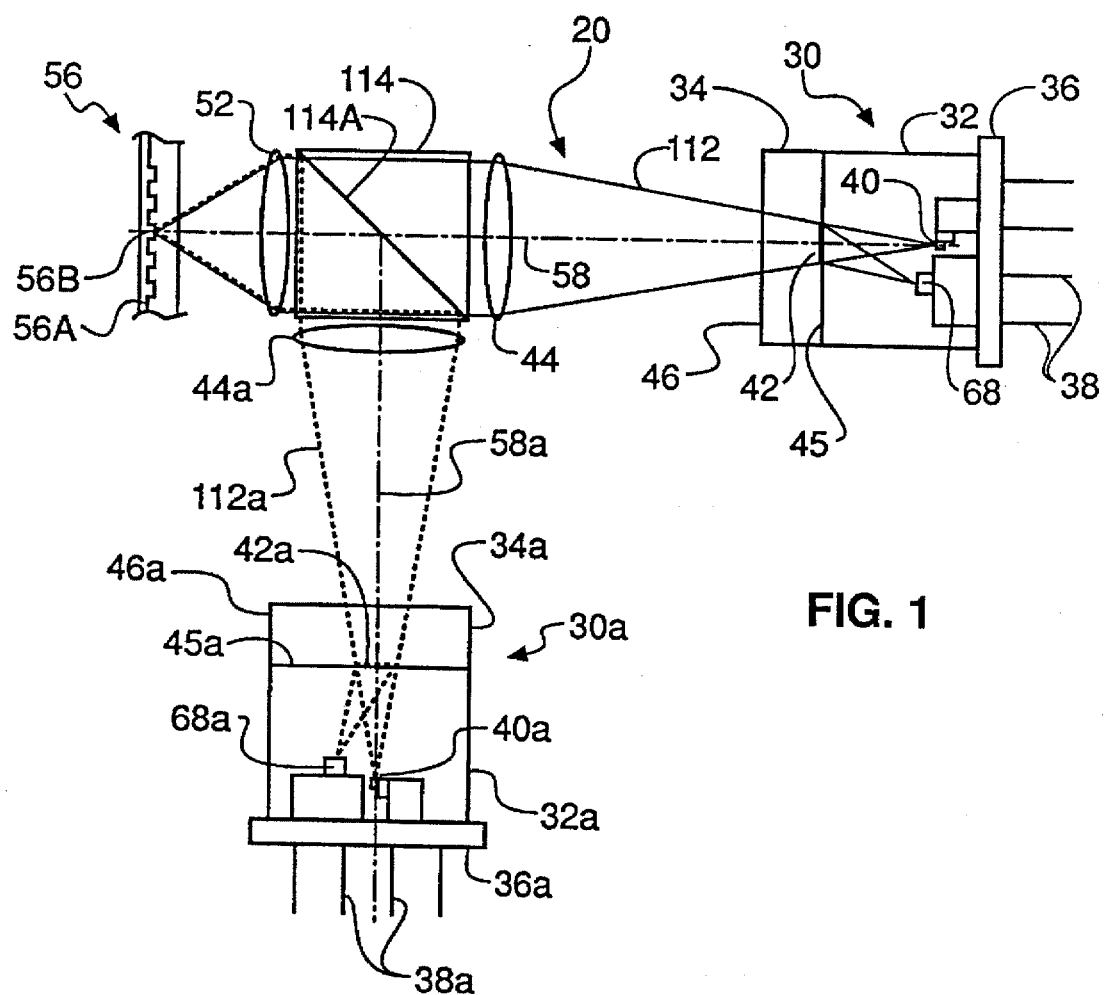
FIG. 1 is a side-sectional view of an optical system which includes an exemplary LDGU in accordance with the present invention.

FIG. 1 shows an exemplary optical system 20 in accordance with the present invention. The components of optical system 20 which process, direct and detect the return beam to provide the FES and TES signals, and a data signal, may be collectively referred to as a focus and tracking sensor system.

The optical system 20 includes an LDGU 30 which may be used in an optical read/write head to both read from and write with multiple wavelengths to optical storage media such as a recordable CDs. The LDGU 30 combines several components into a single package. The LDGU 30 includes a package housing 32, a transparent substrate 34, and a package base 36. The term "transparent substrate" is defined herein as any transparent material, including glass, plastic or film, which may be used to support a grating beam splitter formed therein or thereon. Although the package shown is a can type package, the various components of LDGU 30 may be enclosed in other types of packages as required for a given application. A number of contact pins 38 protrude from the package base 36 for connecting the LDGU 30 to external electronic circuitry (not shown).

There are actually two sets of LDGUs, LDGU 30 and LDGU 30a, which operate at first and second wavelengths, respectively. Where parts in LDGU 30a correspond to those in LDGU 30, the same numbering scheme will be used except that letter "a" will follow the part number in LDGU 30a. For convenience of explanation, the LDGU 30 will first be described and then the LDGU 30a will be described.

The LDGU 30 also includes an optical source 40 which is typically a laser diode. Preferably, the laser diode can be a semiconductor laser diode. Alternatively, the optical source 40 may be a compact laser. The optical source 40 generates a radiation beam which is incident on a grating beam splitter 42 formed on an inner surface 45 of the transparent substrate 34. The optical source 40 includes an effective aperture which is well known to those skilled in the art and can be considered to be a point source. For a laser diode, as the optical source, the effective aperture is defined by the channel waveguide dimensions of the laser cavity. For other compact light sources, this could be a pinhole aperture plate. The grating beam splitter 42 is preferably a blazed grating beam splitter.

The transparent substrate 34 is arranged between the optical source 40 and an optical storage medium 56 such that the radiation beam passes through the substrate. A zero order diffraction component of the radiation beam passes undeflected through the transparent substrate 34 and the grating beam splitter 42 formed thereon and is collimated by collimating lens 44. The radiation beam is then focused by an objective lens 52 onto an optical storage medium 56, which may be, for example, a recordable CD. Disposed between the LDGU 30 and 30a and the collimating lens 44 is a selective beam splitter 114 which will be described later. For purposes of this explanation, the operation of the LDGU 30 will be described as though they were no beam splitter.

The radiation beam is used to store and retrieve information from the optical storage medium 56, and typically has a linear polarization. Alternatively, the incident radiation beam could have other polarizations.

Any of a number of well-known techniques may be used to form the blazed grating beam splitter 42 on the transparent substrate 34. For example, appropriate grating patterns could be photolithographically formed in a layer of photoresist on a surface of transparent substrate 34, an ion milling beam could be used to mill the grating patterns onto the transparent substrate 34, or the grating patterns could be formed using molded clear epoxy, resins, plastics, or sol-gels. In addition, the grating beam splitter could be formed using holographic techniques, in which, for example, two or more laser beams are used to create an interference pattern in a thin layer of photoresist. These and other grating formation techniques are well-known in the art and will not be further described herein. Furthermore, although the grating beam splitter 42 is shown in LDGU 30 on an inner surface 45 of transparent substrate 34, it could also be formed on an outer surface 46 of the substrate, or partially formed on both inner surface 45 and outer surface 46 of the substrate. It may be preferable in many applications, however, to form the grating beam splitter 42 on an inner surface 45 in order to protect it from contaminants.

Alternatively, the transparent substrate could be, for example, a thin film on which a grating beam splitter is formed. The thin film could be mounted in an aperture (not shown) in LDGU 30 such that the incident radiation beam and return beam pass through the transparent substrate 34 and the grating beam splitter 42. In these and other arrangements, the grating beam splitter 42 may alternatively be formed within the transparent substrate 34, rather than on an inner surface 45 or outer surface 46 thereof.

The optical storage medium 56 includes an optical storage medium surface 56A having a number of data tracks formed thereon. Each data track 56B is shown in cross-section and generally extends in a direction perpendicular to the plane of the drawing. The data track 56B is a type of diffraction component-generating structure. The structure diffracts the incident radiation beam because the depth of the structure is generally a fraction of the wavelength of the incident radiation beam and introduces phase differences in the return beam. Although the data track 56B is shown as a raised structure in FIG. 1, a data track 56B in accordance with the present invention may also be, for example, a groove in the storage medium, a region between two grooves in the optical storage medium 56, a series of unconnected raised regions, or other optical path structures of appropriate dimension and refractive index such that diffraction patterns are created in response to an incident radiation beam.

It should be noted that although the data tracks are generally arranged in a spiral configuration on an optical storage medium such as a recordable CD, a given portion of the data track 56B around a point currently illuminated by the incident radiation beam will exhibit little curvature and therefore such a portion may be considered substantially straight. A projection of such a portion of data track 56B on the grating beam splitter 42 will generally lie in a plane separating part of the grating beam splitter 42 into first and second grating elements. A dashed line 58 representing the optical axis is drawn in FIG. 1 between a currently illuminated data track 56B and the center of the optical source 40. The line 58 represents the optical axis of the incident radiation beam and is perpendicular to the data track 56B and the projection thereof onto grating beam splitter 42. A reference plane is defined herein by the optical axis 58 of the incident radiation beam and a tangent to the data track 56B at the point currently illuminated by the incident radiation beam. The substantially straight portion of the data track 56B may be considered part of the tangent to the data track 56B. The projection of data track 56B onto grating beam splitter 42 also generally lies within the reference plane.

The data track 56B reflects and diffracts the incident radiation beam applied thereto. The optical components include the lenses 44 and 52, beam splitter 114, disposed between the grating beam splitter 42 and the data track 56B of the optical storage medium actually defines the optical axis along which light is projected as shown in FIG. 1. The reflected and diffracted incident radiation beam will be referred to herein as a return beam. The return beam is then incident on the grating beam splitter 42, which separates the return beam by principles of diffraction into a number of different portions. These portions are directed towards a detector array 68. The detector array 68 detects the various portions of the return beam and generates signals which, when combined in the manner described below, provide a TES, an FES, and a data signal.

Other noise reduction techniques based on a signal indicative of optical source power may also be used. Front facet subtraction reduces the effect of optical source noise in a detected return beam. Many commonly-used optical sources have a number of different lasing modes, each producing a radiation beam at a slightly different wavelength. Part of the return beam reflected from the optical storage medium returns to the optical source and may produce longitudinal mode-hopping, in which the source hops between two or more of its lasing modes. Longitudinal mode-hopping generally causes intensity noise on the radiation beam produced by the source. Front facet subtraction involves detecting a portion of the incident radiation beam before it arrives at the optical storage medium, adjusting its amplitude and phase delay, and subtracting it from the detected return beam. Additional detail may be found in the above-cited U.S. Pat. No. 5,363,363 issued Nov. 8, 1994 to Gage entitled Apparatus and Method for Laser Noise Cancellation in an Optical Storage System Using a Front Facet Monitor Signal.

Returning to FIG. 1, the LDGUs 30 and 30a permit reading and recording at different wavelengths, by using two optical sources 40 and 40a whose optical paths are combined using the beam splitter 114. Preferably, both optical sources can be semiconductor laser diodes. The beam splitter 114 depicted here is shown as a cube, however, it may take other forms including a prism, plate, or pellicle that would provide an optical surface 114A to control the beam splitting operation. Each optical source 40 and 40a has a complete set of components and associated characteristic of the LDGU. In this embodiment, the optical beams 112 and 112a are combined in a space where the optical beam is collimated, between collimating lenses 44 and 44a and the objective lens 52. The beam splitter 114 may be designed to provide the desired splitting characteristics, efficiency of transmitting the optical beam 112 of the specified wavelength towards the optical storage medium 56 and the efficiency of reflection of the optical beam 112a of the second specified wavelength towards the optical storage medium 56. These efficiencies may be substantially affected by the optical coatings that can be added to the beam splitter 114 at the optical surface 114A of the cube. For example, optical coatings may be added to produce substantially equivalent efficiencies for transmission and reflection of the optical beams 112 and 112a, or it may be desirable to have a higher efficiency associated with one light beam for the purpose of recording and reading information while the other light beam may be used only for reading information and thus may have a much lower efficiency through the beam splitter 114. An issue for the design of the optical coatings at optical surface 114A is the uniformity of the efficiency across the wavelength band of operation from each collimating lens 44 and 44a. With the use of semiconductor type lasers, the operational range may need to be as broad as 5 to 30 nm, depending on ambient temperature, laser aging, operating power, and the ability to select a laser with the desired wavelength of emission.

The LDGUs 30 and 30a should be positioned so that the objective lens 52 delivers the focus spots of light to the data track 56B for nearly the same distance between optical storage medium 56 and objective lens 52. This is accomplished, by adjusting the location for one of the distances separating the collimating lens and LDGU along the optical axis 58 or 58a. This adjustment may or may not be used to compensate for the difference in the wavelength of emission from optical sources 40 and 40a, depending on the level of achromatization for the elements common to the optical paths between the optical sources 40 and 40a and the optical storage medium 56.

Figure 2:
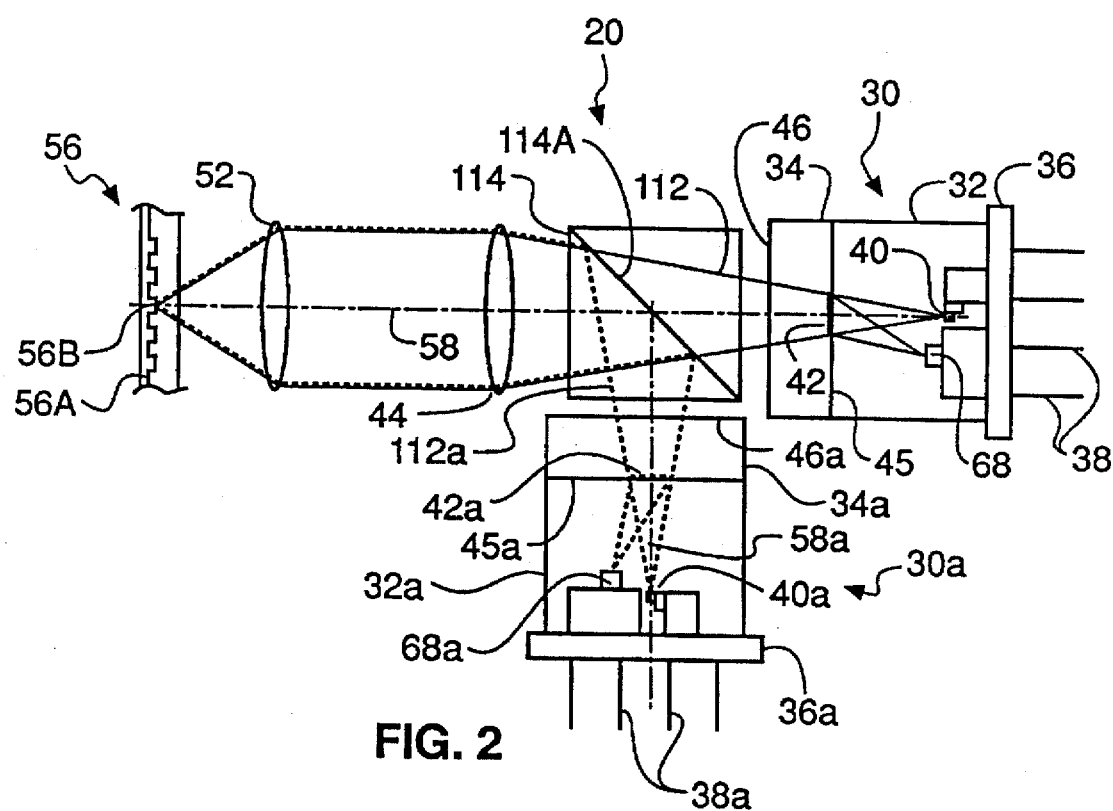
FIG. 2, FIG. 3, and FIG. 4 also show side sectional views of other embodiments of other LDGU systems in accordance with the present invention.
Figure 3:
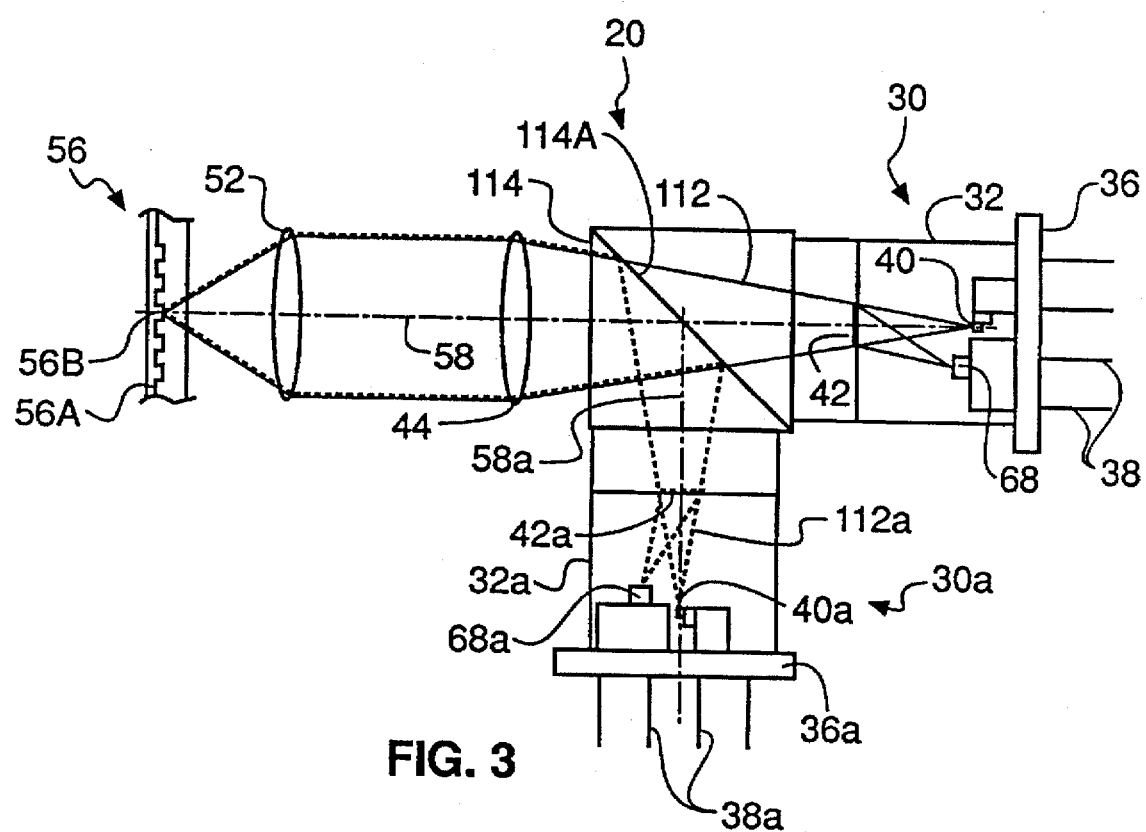

FIG. 2 and FIG. 3 show other embodiments of LDGUs 30. In FIG. 2, the beam splitter 114 has been moved so that a single collimating lens 44 is used for delivery of light to the disk 56. This has the advantages of eliminating the collimating lens 44a and having the LDGUs 30 and 30a positioned nearer to each other to reduce the separation of the associated electronic circuits and connections. This arrangement is such that light reflected from the storage medium is focused on the detectors and the beam splitter is disposed in a region of noncollimated light. The position of the focused spots at the disk 56 for LDGU 30 and 30a can be controlled by adjusting the position of LDGU 30 and 30a along their optical axes 58 and 58a, 30 respectively.

FIG. 3 shows the LDGUs 30 and 30a and the beam splitter 114 combined to form a single subassembly. The grating beam splitters 42 and 42a have been put onto the beam splitter 114 and the position of the optical sources 30 and 30a within the LDGUs is determined by the dimensions of 32 and 32a. Although the transparent substrates 34 and 34a are not shown, they may be included in the design by attachment to the beam splitter 114. The advantage for this configuration is the integration of the LDGU 30 and 30a into a single subassembly that facilitates the assembly of the optical system 20.

Figure 4:
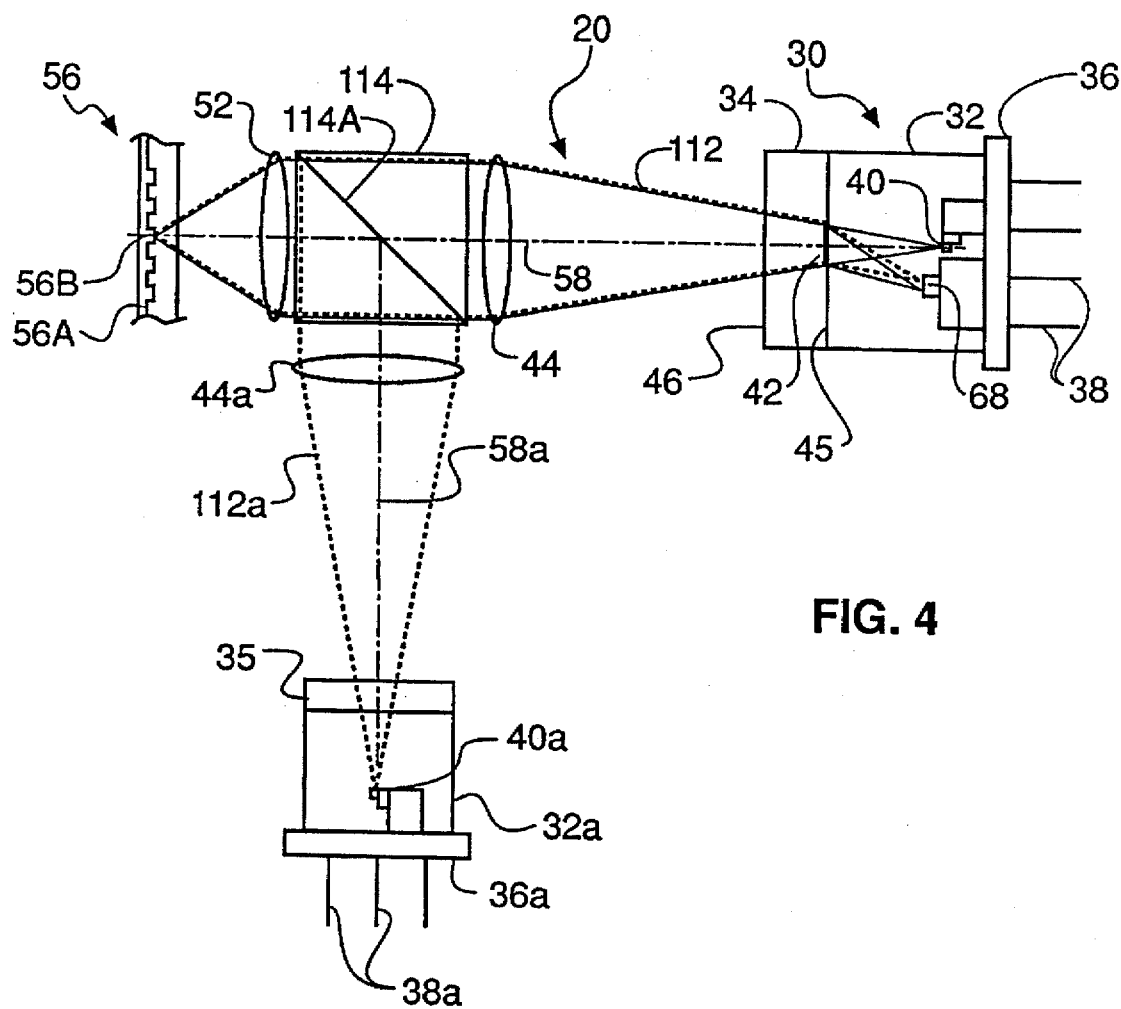
Figure 5:
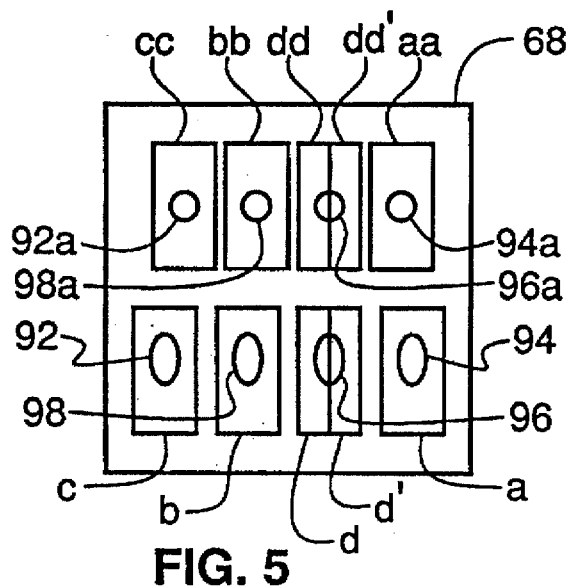
FIG. 5 is a detailed view of an exemplary detector array in accordance with the present invention.
Figure 6:
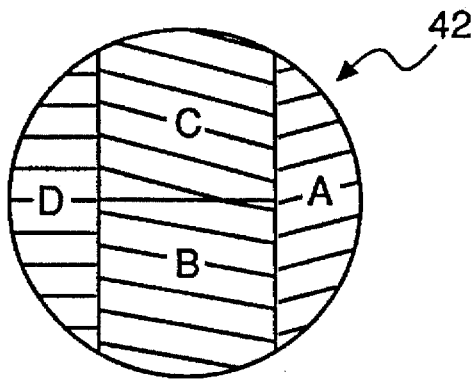
FIG. 6 is a detailed view of an exemplary blazed grating beam splitter in accordance with the present invention.
Figure 7:
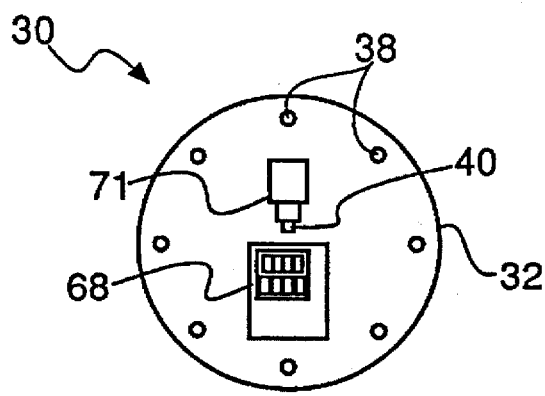
FIG. 7 is a view of the exemplary LDGU of FIG. 1 as viewed along the optical axis.
Figure 8:
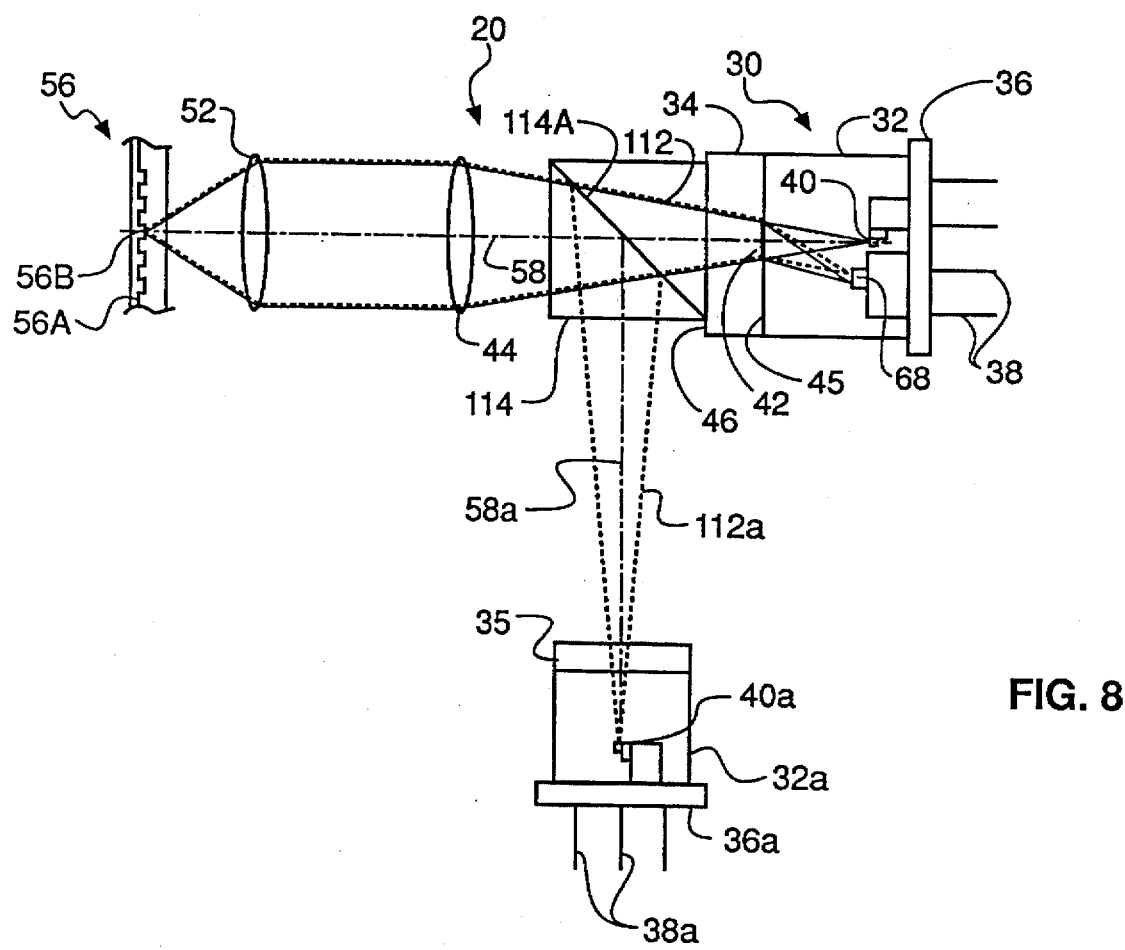
FIG. 8 and FIG. 9 show side sectional views of other embodiments of LDGU systems in accordance with the present invention.

Another embodiment of the optical system 20 is shown in FIG. 4. The optical source 40a is located in a position comparable to that of FIG. 1 and the transparent substrate 34a is replaced with a transparent plate 35. The Grating beam splitter 42 and detector array 68 of LDGU 30 are used for signal processing both optical beams. In this configuration, a photodetector pattern is needed as shown in FIG. 5. This pattern is useful for a grating element as illustrated in FIG. 6. The segments of the Grating A, B, C, and D split the beam to produce focus spots 92a, 94a, 96a, and 98a, respectively, onto detectors aa, bb, cc, dd, and dd' from optical source 40a, the shorter wavelength light source. Because of the diffractive nature of the beam splitting using grating beam splitter 42, optical source 40 will produce spots separated from the spots resulting from optical source 40a. Optical source 40a will produce the focus spots 92, 94, 96, and 98 on the detectors a, b, c, d, and d', In FIG. 5, the detectors are illustrated as a unique sets, however, it is possible to combine the area of each detector (i.e., a and aa, b and bb, c and cc, etc.) to eliminate redundancy in the electronics for processing the signals from these detectors. These areas may be combined electrically using traces on the surface of the detector, providing a continuous detector area between each pair, or combining the signals using direct electrical contact or electronic signal amplifiers (not shown) between the detector 68 and prior to the electronics for processing the information. A top view of the LDGU 30 is shown in FIG. 7 to illustrate the relative position of the optical source 40 and detector 68. FIG. 8 shows another configuration resembling that of FIG. 2 where the beam splitter 114 has been placed between the collimating lens 44 and the LDGU 30. As before, the grating beam splitter 42 and the detector 68 are used to process the information for either optical source 40 or 40a. The transparent plate 35 and the transparent substrate 34 may be incorporated as part of the beam splitter structure to permit the combination of these elements to form a single subassembly as shown in FIG. 3.

Figure 9:
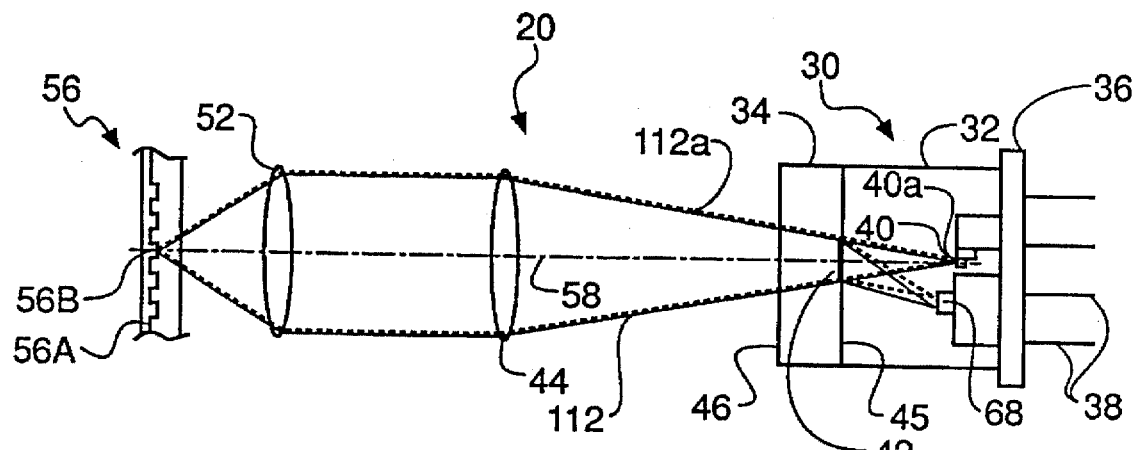
Figure 10:
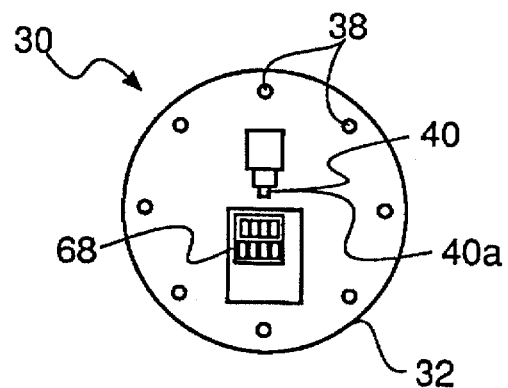
FIG. 10 is a view of the exemplary LDGU of FIG. 1 looking along the optical axis and illustrates the location of the optical sources, exemplary detector, and preamplifier.

In FIG. 9 the optical sources 40 and 40a have been combined within LDGU 30 and the detector array 68 will resemble the detector illustrated in FIG. 5. Because the light beams are not being combined using a beam splitter, to produce coincidence of beams, the optical sources 40 and 40a must be located as near as possible to one another along optical axis 58. This will reduce degradation of the quality of the optical beam reaching the optical storage medium 56 and errors in the information contained in the signals from the detectors. The most practical method of locating the optical sources 40 and 40a very near to one another is the use of semiconductor lasers. The compact size of the laser cavity allows close proximity by attaching the semiconductor laser chips together along any axis perpendicular to the optical axis 58. It will be necessary to maintain electrical isolation of the lasers so that the optical sources are individually addressable. Also, depending on the wavelengths of operation, it is possible to fabricate the optical sources 40 and 40a on a single semiconductor substrate. A top view of the LDGU 30 is shown in FIG. 10 to illustrate to relative position of the optical source 40 and 40a and the detector array 68.

Figure 11:
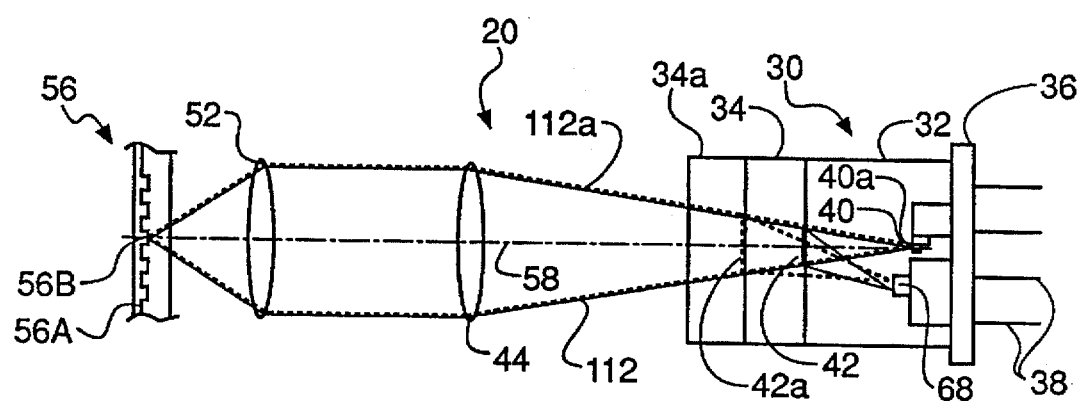
FIG. 11 shows a side sectional view of another embodiment of a system in accordance with the present invention.

Another approach for separating the two wavelengths is shown in FIG. 11. Here a second transparent substrate 34a having a grating beam splitter 42a has been added to operate specifically on the wavelength from optical source 40a. The advantage being unique control over the optical beams returning from the optical disk for delivery to the detector array 68. This may be used to affect the size or shape of the spots on the detector array 68.

Additional variations may be made in the arrangements discussed above that allow for the use of multiple wavelengths including, for example, the design of the detector, positions of the light sources, methods of combining the optical beams, achromatization of the lens elements, and grating design to accommodate the two wavelengths.

The invention has been described in detail with particular reference to certain preferred embodiments thereof, but it will be understood that variations and modifications can be effected within the spirit and scope of the invention.

| PARTS LIST | |
| --- | --- |
| A, B, C, D | grating elements |
| a, b, c, d, d' | detectors |
| aa, bb, cc, dd, dd' | detectors |
| 20 | optical system |
| 30 | laser-detector-grating unit (LDGU) |
| 30a | laser-detector-grating unit (LDGU) |
| 32 | package housing |
| 32a | laser-detector-grating unit (LDGU) |
| 34 | transparent substrate |
| 34a | transparent substrate |
| 35 | transparent plate |
| 36 | package base |
| 36a | package base |
| 38 | contact pins |
| 38a | contact pins |
| 40 | optical source |
| 40a | optical source |
| 42 | grating beam splitter |
| 42a | grating beam splitter |
| 44 | collimating lens |
| 44a | collimating lens |
| 45 | inner surface |

-continued

| PARTS LIST | |
| --- | --- |
| 45a | inner surface |
| 46 | outer surface |
| 46a | outer surface |
| 52 | objective lens |
| 56 | optical storage medium |
| 56A | optical storage medium surface |
| 56B | data track |
| 58 | optical axis (dashed line) |
| 58a | optical axis (dashed line) |
| 68 | detector array |
| 68a | detector array |
| 92 | focus spots |
| 92a | focus spots |
| 94 | focus spots |
| 94a | focus spots |
| 96 | focus spots |
| 96a | focus spots |
| 98 | focus spots |
| 98a | focus spots |
| 112 | optical beam |
| 112a | optical beam |
| 114 | beam splitter |
| 114A | optical surface |

We claim:

1. In an optical system for generating a radiation beam to be applied to a data track of an optical storage medium, the improvement comprising:

a) a LDGU including first and second optical light sources, respectively, for producing light at different wavelengths, and a detector for receiving light returned from the optical storage medium and producing an electrical signal representing focus and tracking errors and data;

b) the LDGU for receiving light from the first and second sources and including first and second selective beam splitters for selectively applying light from each optical light source to the data track of the optical storage medium and defining an optical axis for each optical light source along which light is projected to the data track.

2. The optical light source of claim 1 wherein the first and second light sources are semiconductor laser diodes.

* * * * *